US010512129B2

(12) United States Patent
Hariman et al.

(10) Patent No.: US 10,512,129 B2
(45) Date of Patent: *Dec. 17, 2019

(54) BOOST REGULATORS WITH DYNAMIC REGULATION BAND

(71) Applicant: SKYWORKS SOLUTIONS, INC., Woburn, MA (US)

(72) Inventors: George A. Hariman, Sunnyvale, CA (US); Chak S. Ngai, Campbell, CA (US); Wendy Ng, Los Gatos, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/214,457

(22) Filed: Dec. 10, 2018

(65) Prior Publication Data

US 2019/0116638 A1 Apr. 18, 2019

Related U.S. Application Data

(63) Continuation of application No. 15/723,406, filed on Oct. 3, 2017, now Pat. No. 10,182,476, which is a continuation of application No. 15/260,139, filed on Sep. 8, 2016, now Pat. No. 9,801,242.

(60) Provisional application No. 62/234,269, filed on Sep. 29, 2015.

(51) Int. Cl.
*H05B 33/08* (2006.01)
*H05B 37/02* (2006.01)

(52) U.S. Cl.
CPC ..... *H05B 33/0815* (2013.01); *H05B 37/0272* (2013.01); *H05B 37/0281* (2013.01); *Y02B 20/347* (2013.01)

(58) Field of Classification Search
CPC .... H05B 33/08; H05B 33/0815; H05B 37/02; H05B 37/0281; H02M 3/158; H02M 3/156; H02M 3/157; H02M 3/1582; H02M 1/088
See application file for complete search history.

(56) References Cited

U.S. PATENT DOCUMENTS 6,140,808 A 10/2000 Massie
6,804,091 B2 10/2004 Jenkins et al.
(Continued)

*Primary Examiner* — Thai Pham
(74) *Attorney, Agent, or Firm* — Knobbe, Martens, Olson & Bear, LLP

(57) ABSTRACT

Boost regulators with dynamic regulation band are disclosed. In certain configurations, a boost regulator system includes a field effect transistor (FET) current source having a gate controlled by a current level control signal, a source that receives a regulator output voltage, and a drain that outputs a current. The boost regulator system further includes a boost regulator that generates the regulator output voltage based on a reference voltage. The boost regulator includes a headroom detection circuit electrically coupled to the drain of the FET current source and operable to generate a headroom signal indicating a detected voltage headroom of the FET current source. The boost regulator further includes a regulator control circuit that controls a voltage level of the reference voltage based on the headroom signal, and that controls a size of a regulation band of the boost regulator based on the current level control signal.

20 Claims, 7 Drawing Sheets

(56) References Cited

U.S. PATENT DOCUMENTS

| | | | |
|---|---|---|---|
| 8,120,283 B2* | 2/2012 | Tanaka | H05B 33/0815 |
| | | | 315/307 |
| 8,786,371 B2 | 7/2014 | Popplewell et al. | |
| 9,035,560 B2 | 5/2015 | Li et al. | |
| 9,144,126 B2 | 9/2015 | Raval et al. | |
| 9,801,242 B2 | 10/2017 | Hariman et al. | |
| 10,182,476 B2 | 1/2019 | Hariman et al. | |
| 2007/0063681 A1 | 3/2007 | Liu | |
| 2009/0273290 A1* | 11/2009 | Ziegenfuss | H05B 33/0815 |
| | | | 315/193 |
| 2012/0104962 A1 | 5/2012 | Chen et al. | |
| 2012/0112723 A1 | 5/2012 | He et al. | |
| 2013/0076252 A1* | 3/2013 | Shao | H05B 33/0824 |
| | | | 315/186 |
| 2015/0061528 A1* | 3/2015 | Raval | H05B 33/0827 |
| | | | 315/210 |
| 2015/0171730 A1* | 6/2015 | Yin | H02M 3/157 |
| | | | 323/272 |
| 2016/0276824 A1* | 9/2016 | Shin | H02H 3/16 |
| 2017/0094734 A1 | 3/2017 | Hariman et al. | |
| 2018/0124884 A1 | 5/2018 | Hariman et al. | |

* cited by examiner

BOOST REGULATORS WITH DYNAMIC REGULATION BAND

CROSS-REFERENCE TO RELATED APPLICATIONS

This application is a continuation of U.S. application Ser. No. 15/723,406, filed Oct. 3, 2017, titled "BOOST REGULATORS WITH DYNAMIC REGULATION BAND," which is a continuation of U.S. application Ser. No. 15/260,139, filed Sep. 8, 2016, titled "APPARATUS AND METHODS FOR BOOST REGULATORS WITH DYNAMIC REGULATION BAND," which claims the benefit of priority under 35 U.S.C. § 119(e) of U.S. Provisional Patent Application No. 62/234,269, filed Sep. 29, 2015 and titled "APPARATUS AND METHODS FOR BOOST REGULATORS WITH DYNAMIC REGULATION BAND," which is herein incorporated by reference in its entirety.

BACKGROUND

Field

Embodiments of the invention relate to electronic systems, and in particular to boost regulators.

Description of the Related Technology

A mobile device can include one or more light emitting elements, such as flash light emitting diodes (LEDs), that can be used to provide illumination in low-light conditions. Including flash LEDs or other light emitting elements in a mobile device can enhance the quality of pictures or video captured using the mobile device and/or provide the capability of operating the mobile device as a flash light.

The light output of a flash LED changes based on a forward current flowing therethrough. To provide a light pulse using the flash LED, a current source can control a current flowing through the flash LED over time.

SUMMARY

In certain embodiments, the present disclosure relates to a boost regulator system including a controllable light source and a boost regulator. The controllable light source includes a first current source and a first light emitting element electrically connected in series with the first current source. The first current source is configured to generate a current that controls an amount of light emitted from the first light emitting element. The boost regulator is configured to receive an input voltage and to generate an output voltage that powers the first current source. The boost regulator includes a regulation band control circuit that controls a size of a regulation band of the boost regulator based on a current level of the first light emitting element.

In some embodiments, the regulation band control circuit controls the size of the regulation band of the boost regulator by controlling an upper band voltage of the regulation band.

In various embodiments, the boost regulator further includes a sampling circuit configured to generate a headroom signal by sampling a voltage of the first light emitting element.

In a number of embodiments, the boost regulator further includes a first comparator configured to compare the headroom signal to an upper band voltage of the regulation band and a second comparator configured to compare the headroom signal to a lower band voltage of the regulation band, and the regulation band control circuit is configured to control a voltage level of the upper band voltage.

According to several embodiments, the boost regulator further includes an inductor, a plurality of switches, and a switch controller operable to selectively control the plurality of switches to control a current of the inductor. The boost regulator further includes a reference voltage programming circuit configured to control a voltage level of a reference voltage of the switch controller based on an output of the first comparator and an output of the second comparator.

In various embodiments, the first light emitting element includes a flash light emitting diode.

In some embodiments, the controllable light source includes a current control circuit that receives a current level control signal and controls the current level of the first light emitting element based on the current level control signal.

According to a number of embodiments, the regulation band control circuit controls the size of the regulation band based on the current level control signal.

In several embodiments, the boost regulator is operable in a selected mode chosen from a plurality of modes including a bypass mode and a boost mode.

In accordance with some embodiments, the flash light emitting diode circuitry further includes a second current source and a second light emitting element electrically connected in series with the second current source.

In certain embodiments, the present disclosure relates to a mobile device. The mobile device includes a battery, a controllable light source, and a boost regulator. The battery generates a battery voltage. Additionally, the controllable light source includes a current source and a light emitting element, and the current source is configured to generate a current that flows through the light emitting element. Furthermore, the boost regulator is configured to receive the battery voltage and to generate an output voltage that powers the current source. The boost regulator includes a regulation band control circuit that controls a size of a regulation band of the boost regulator based on a current level of the light emitting element.

In several embodiments, the regulation band control circuit controls the size of the regulation band of the boost regulator by controlling an upper band voltage of the regulation band.

In some embodiments, the light emitting element is a flash light emitting diode.

In a number of embodiments, the boost regulator further includes a sampling circuit configured to generate a headroom signal by sampling a voltage of the flash light emitting diode.

According to various embodiments, the boost regulator further includes a first comparator configured to compare the headroom signal to an upper band voltage of the regulation band and a second comparator configured to compare the headroom signal to a lower band voltage of the regulation band. The regulation band control circuit is configured to control a voltage level of the upper band voltage.

In certain embodiments, the present disclosure relates to a method of controlling a light source in an electronic device. The method includes generating an output voltage from an input voltage using a boost regulator, providing the output voltage to a current source of a controllable light source, controlling a current flowing through a light emitting element of the controllable light source using the current source, and controlling a size of a regulation band of the boost regulator based on a current level of the light emitting element.

In a number of embodiments, controlling the size of the regulation band includes controlling an upper band voltage of the regulation band.

In various embodiments, the method further includes generating a headroom signal indicative of an amount of voltage headroom of the current source, and comparing the headroom signal to an upper band voltage of the regulation band and to a lower band voltage of the regulation band.

In several embodiments, the method further includes controlling a reference voltage of a switch controller of the boost regulator based on the comparisons.

In some embodiments, the method further includes controlling the current level of the light emitting element using a current level control signal, and controlling the size of the regulation band based on the current level control signal.

DETAILED DESCRIPTION OF EMBODIMENTS

Figure 1:
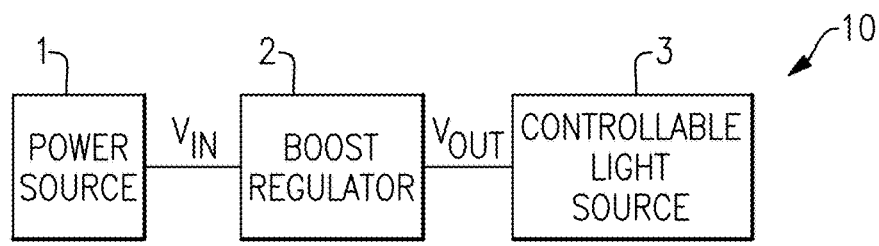
FIG. 1 is a schematic diagram of one embodiment of an electronic system.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A mobile device or other electronic system can include a flash LED or other light emitting element that can be selectively activated to provide illumination. To control the amount of light emitted from the flash LED, a current source can be used to generate a current that flows through the flash LED. By adjusting the magnitude or level of the current over time, light emissions from the flash LED can be controlled.

A mobile device can include a battery having a voltage level that varies with the amount of stored charge. As a user operates the mobile device, the voltage level of the battery can drop. To provide the current source with sufficient voltage headroom to generate the current for the flash LED, the mobile device can include a boost regulator that generates an output voltage used to power the current source.

The boost regulator can be operated in a plurality of modes. When the mobile device's battery has a relatively high voltage level, the boost regulator can operate in a bypass mode in which the boost regulator generates the output voltage without boosting. For instance, a switch electrically connected between the battery voltage and the output voltage can be turned on in the bypass mode.

However, when the battery has a relatively low voltage level, the boost regulator can operate in a boost mode in which the output voltage is regulated to have a voltage level that is greater than the battery voltage. The boosted output voltage is provided to the current source such that the current source operates with sufficient voltage headroom even at low battery voltage levels.

When providing boosting, the boost regulator operates with a regulation band. The regulation band includes a lower band voltage and an upper band voltage, and the boost regulator provides regulation to maintain the output voltage within the regulation band.

Provided herein are apparatus and methods for boost regulators with dynamic regulation band. In certain configurations, a boost regulator system includes a boost regulator, a current source, and a light emitting element, such as a flash LED, that is controlled using a current generated by the current source. The boost regulator generates an output voltage that powers the current source. The boost regulator operates with a regulation band that changes based on a current level of the light emitting element.

A fixed regulation band size can provide a relatively large separation between the output voltage and the input voltage upon transitioning a boost regulator from a bypass mode to a boost mode. On one hand, providing a relatively large separation between the output voltage and the input voltage allows the boost regulator to provide a relatively stable output voltage with small ripple. However, such a boost regulator can operate with decreased efficiency when the flash LED is operated at low current levels and/or a current source that provides current to the flash LED can operate with poor voltage headroom.

In contrast, the boost regulators herein operate with a regulation band that changes based on the current level of the flash LED or other light emitting element. By controlling the boost regulator in this manner, the overall efficiency of the system can be enhanced over the current range of the flash LED. Thus, the boost regulator operates with adaptive headroom control, which provides enhanced efficiency and relatively small output ripple. The boost regulators operate with a regulation band size that dynamically changes based on the load current of the boost regulator.

A boost regulator can have an output voltage that includes ripple when the output voltage is close to the input voltage for a light-load condition. The ripple can be associated with insufficient current-sense information when the output voltage and the input voltage are relatively close to one another. For example, duty-cycle limitations of the boost regulator can result in poor regulation performance and large output ripples of, for instance, 300 mV or more.

To reduce or eliminate output ripple in such operating conditions, a boost regulator can operate with an output voltage that is controlled to be higher than normal at light-load conditions, such that the boost regulator operates with sufficient current-sense information.

For example, when transitioning the boost regulator from bypass mode to boost mode, the output voltage of the boost regulator can be controlled above the upper band voltage of the boost regulator's regulation band. Configuring the boost regulator in this manner can increase a voltage difference between the output voltage and the input voltage when commencing boost mode. After the boost regulator is transitioned from the bypass mode to the boost mode, regulation operations of the boost regulator can result in the output voltage being controlled to an upper portion of the regulation band. The output voltage can remain in the upper portion of the regulation band (for instance, in an upper quarter of the regulation band), thereby providing a relatively large separation between the output voltage and the input voltage and robust current-sense information.

A voltage width of a boost regulator's regulation band can be selected based on a maximum load current. For example, the boost regulator can have a voltage drop from the input voltage to the output voltage that is based on internal resistances or impedances of the boost regulator, such as the parasitic resistances through the boost regulator's inductor and/or output regulation switch or diode. The voltage drop can be based on a product of the maximum load current and the boost regulator's internal resistances or impedances, and thus the regulation band of the boost regulator can be selected based on the maximum load current.

When the boost regulator powers a current source that provides current to a flash LED, the boost regulator's maximum load current is based on a current level of the flash LED. A boost regulator can be implemented with a regulation band that is based on the flash LED's maximum current level. Although such an implementation can provide relatively robust regulation performance and low output ripple across current load conditions, such an implementation can also suffer from reduced power efficiency at lower flash LED current levels.

The boost regulators herein operate with a regulation band that is dynamically controlled based on the current level of the flash LED or other light emitting element, thereby achieving higher efficiency at back-off power levels.

FIG. 1 is a schematic diagram of one embodiment of an electronic system 10. The electronic system 10 includes a power source 1, a boost regulator or converter 2, and a controllable light source 3.

As shown in FIG. 1, the power source 1 generates an input voltage $V_{IN}$ for the boost regulator 2. In certain configurations, the power source 1 includes a battery, and the input voltage $V_{IN}$ corresponds to a battery voltage.

The boost regulator 2 receives the input voltage $V_{IN}$ and generates the output voltage $V_{OUT}$. In certain configurations, the boost regulator 2 is operable in a selected mode chosen from multiple modes, including a bypass mode and a boost mode. When the boost regulator 2 is operated in the bypass mode, the boost regulator 2 can generate the output voltage $V_{OUT}$ from the input voltage $V_{IN}$ without boost regulation. When operated in this manner, the output voltage $V_{OUT}$ can be less than the input voltage $V_{IN}$ by a voltage drop through the boost regulator 2. The voltage drop can be associated with internal resistances or impedances of the boost regulator 2, such as a voltage drop across an inductor and/or regulation switch. When the boost regulator 2 operates in the boost mode, the boost regulator 2 provides boost regulation to generate the output voltage $V_{OUT}$ with a voltage level that is greater than the input voltage $V_{IN}$.

The electronic system 10 further includes the controllable light source 3, which receives the output voltage $V_{OUT}$. The controllable light source 3 includes at least one current source and at least one light emitting element. In certain configurations, a current source generates a current that flows through a corresponding light emitting element to control light emissions. In one embodiment, the controllable light source 3 includes flash LED circuitry including one or more current sources and one or more flash LEDs.

Implementing the electronic system 10 to include the boost regulator 2 allows the current source(s) of the controllable light source 3 to operate with sufficient voltage headroom, even when the input voltage $V_{IN}$ is relatively small.

Additional details of the electronic system 10 can be as described earlier.

Figure 2:
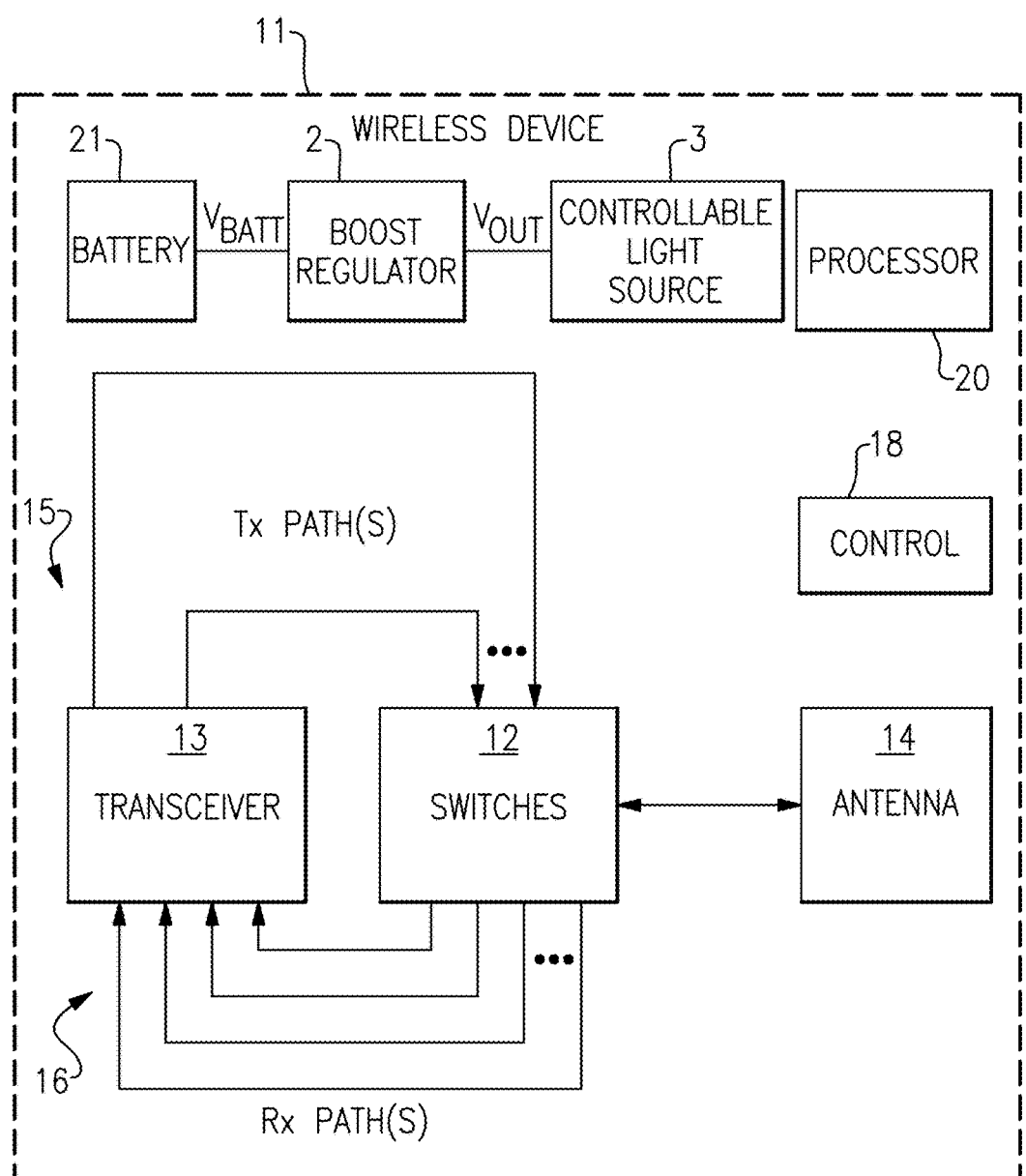
FIG. 2 is a schematic diagram of one embodiment of a wireless device.

FIG. 2 is a schematic block diagram of one embodiment of a wireless device 11.

The example wireless device 11 depicted in FIG. 2 can represent a multi-band and/or multi-mode device such as a multi-band/multi-mode mobile phone. In the illustrated configuration, the wireless device 11 includes switches 12, a transceiver 13, an antenna 14, a control component 18, a processor 20, a battery 21, a boost regulator 2, and a controllable light source 3.

The transceiver 13 can generate RF signals for transmission via the antenna 14. Furthermore, the transceiver 13 can receive incoming RF signals from the antenna 14.

It will be understood that various functionalities associated with the transmission and receiving of RF signals can be achieved by one or more components that are collectively represented in FIG. 2 as the transceiver 13. For example, a single component can be configured to provide both transmitting and receiving functionalities. In another example, transmitting and receiving functionalities can be provided by separate components.

Similarly, it will be understood that various antenna functionalities associated with the transmission and receiving of RF signals can be achieved by one or more components that are collectively represented in FIG. 2 as the antenna 14. For example, a single antenna can be configured to provide both transmitting and receiving functionalities. In another example, transmitting and receiving functionalities can be provided by separate antennas. In yet another example, different bands associated with the wireless device 11 can be provided with different antennas.

In FIG. 2, one or more output signals from the transceiver 13 are depicted as being provided to the antenna 14 via one or more transmission paths 15. In the example shown, different transmission paths 15 can represent output paths associated with different bands and/or different power outputs (e.g., low power output and high power output). Although FIG. 2 illustrates a configuration using two transmission paths 15, the wireless device 11 can be adapted to include more or fewer transmission paths 15.

The transmission paths 15 can carry a wide variety of RF signals, including, for example, Global System for Mobile (GSM) signals, code division multiple access (CDMA) signals, wideband code division multiple access (WCDMA) signals, wireless local area network (WLAN) signals, Long Term Evolution (LTE) signals, and/or Enhanced Data for GSM Evolution (EDGE) signals.

In FIG. 2, one or more detected signals from the antenna 14 are depicted as being provided to the transceiver 13 via one or more receiving paths 16. In the example shown, different receiving paths 16 can represent paths associated with different bands. Although FIG. 2 illustrates a configuration using four receiving paths 16, the wireless device 11 can be adapted to include more or fewer receiving paths 16.

To facilitate switching between receive and transmit paths, the switches 12 can be configured to electrically connect the antenna 14 to a selected transmit or receive path. Thus, the switches 12 can provide a number of switching functionalities associated with an operation of the wireless device 11. In certain configurations, the switches 12 can include a number of switches that provide functionalities associated with, for example, switching between different bands, switching between different power modes, switching between transmission and receiving modes, or some combination thereof. The switches 12 can also provide additional functionality, including filtering and/or duplexing of signals.

FIG. 2 shows that in certain configurations, a control component 18 can be provided for controlling various control functionalities associated with the mobile device 11, including, for example, control functionalities associated with the boost regulator 2 and/or the controllable light source 3. In certain configurations, the control component 18 generates a mode control signal that controls a mode of operation of the boost regulator 2. In certain configurations, the control component 18 controls a current level of one or more light emitting elements of the controllable light source 3.

In certain configurations, a processor 20 can be configured to facilitate implementation of various processes described herein. The processor 20 can operate using computer program instructions, which direct the processor 20 or other programmable data processing apparatus to operate in a particular manner.

The battery 21 can be any suitable battery for use in the wireless device 11, including, for example, a lithium-ion battery. As shown in FIG. 2, the battery 21 generates a battery voltage $V_{BATT}$.

In the illustrated configuration, the boost regulator 2 receives the battery voltage $V_{BATT}$ and generates the output voltage $V_{OUT}$, which is provided to the controllable light source 3. The controllable light source 3 includes at least one current source and at least one light emitting element. In certain configurations, a current source generates a current that flows through a corresponding light emitting element to control light emissions. In one embodiment, the controllable light source 3 includes flash LED circuitry including one or more current sources and one or more flash LEDs. The output voltage $V_{OUT}$ is used to power the controllable light source 3.

Additional details of the wireless device 11 can be as described earlier.

Figure 3A:
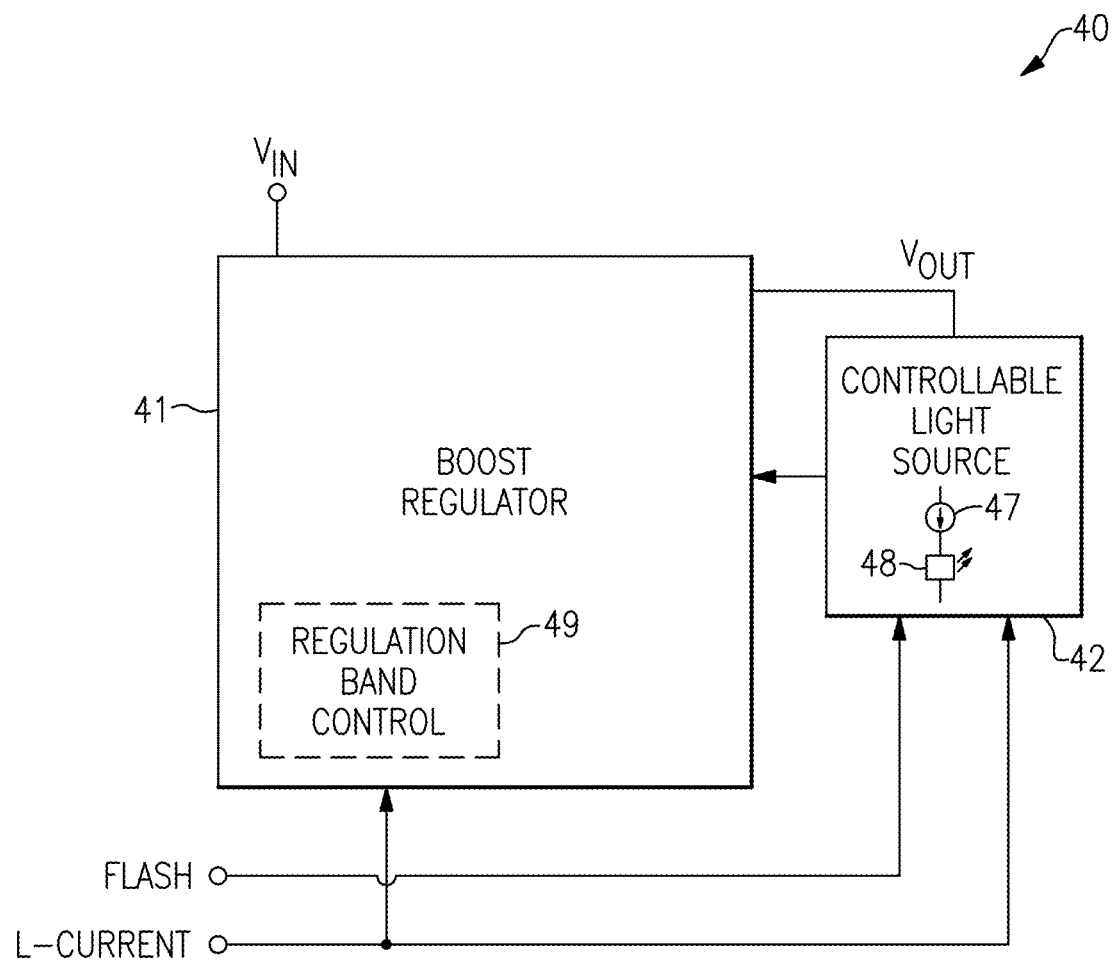
FIG. 3A is a schematic diagram of one embodiment of a boost regulator system.

FIG. 3A is a schematic diagram of one embodiment of a boost regulator system 40. The boost regulator system 40 includes a boost regulator 41 and a controllable light source 42.

As shown in FIG. 3A, the controllable light source 42 includes a current source 47 and a light emitting element 48 electrically connected in series with the current source 47. An amount of current generated by the current source 47 is controlled by a current level control signal L-CURRENT. Additionally, the flash control signal FLASH is used to control the current source 47 to generate a current pulse operable to generate a flash of light using the light emitting element 48. Including the current level control signal LED_CURRENT can enhance the flexibility by allowing the intensity or brightness of light emissions during a flash event to be controlled.

The boost regulator 41 receives an input voltage $V_{IN}$ and generates an output voltage $V_{OUT}$ that powers the current source 47. The boost regulator 41 includes a regulation band control circuit 49 that controls a size of a regulation band of the boost regulator 41 based on a current level of the light emitting element 48, which is indicated by the current level control signal L-CURRENT, in this embodiment.

Thus, the boost regulator 41 includes the regulation band control circuit 49 to control a regulation band of the boost regulator 41 based on the current level of the light emitting element 47. Implementing the boost regulator 41 in this manner achieves higher efficiency at back-off power levels.

For example, the overall efficiency of the system can be enhanced over the current range of the light emitting element 48.

Accordingly, the boost regulator 41 operates with adaptive headroom control that provides enhanced efficiency and relatively small output ripple. The boost regulator 41 operates with a regulation band size that dynamically changes based on the load current of the boost regulator 41.

In the illustrated embodiment, the current level of the light emitting element 47 is indicated by the current level signal L-CURRENT. However, other implementations are possible, such as configurations in which the current level of the light emitting element 47 is sensed or detected.

Figure 3B:
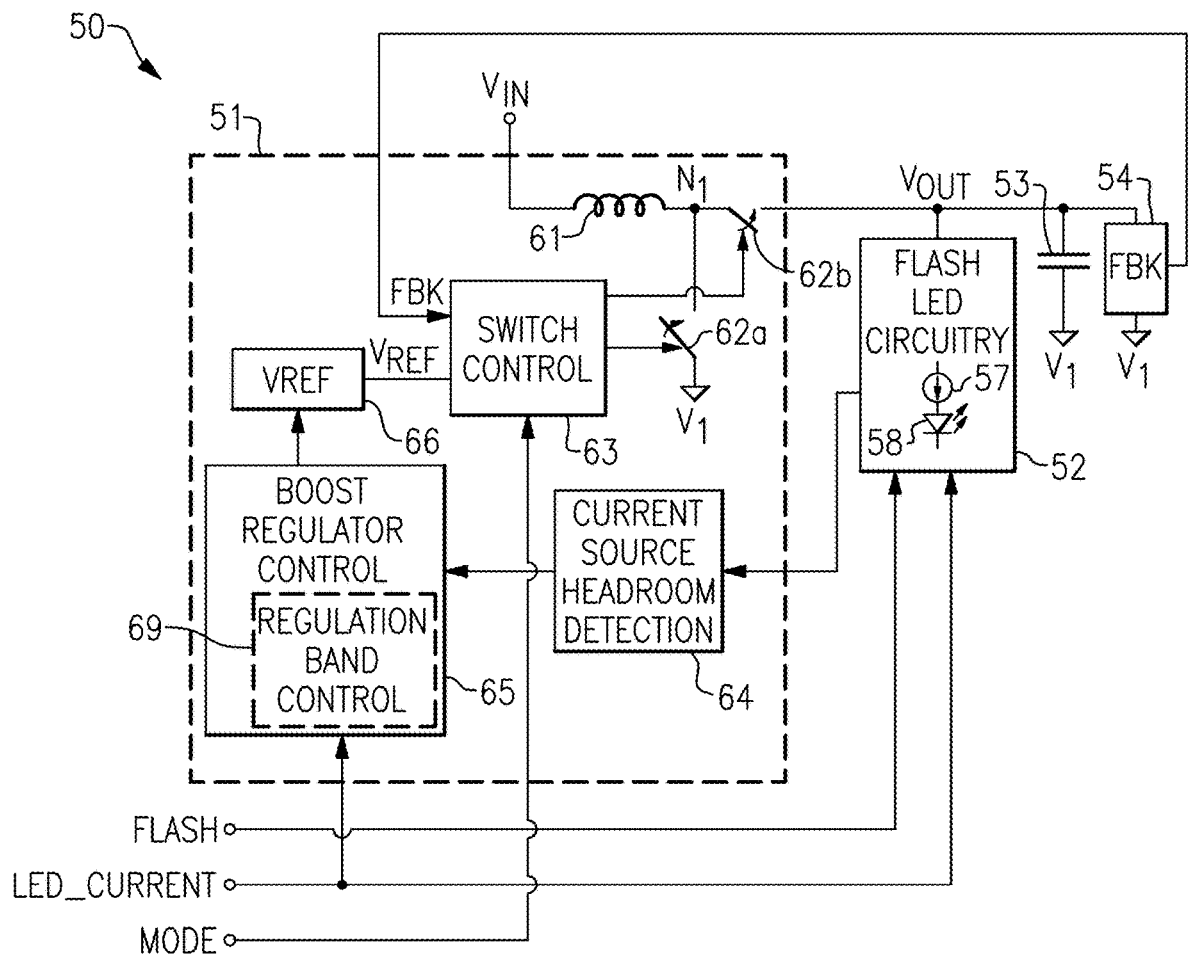
FIG. 3B is a schematic diagram of one embodiment of a boost regulator system.

FIG. 3B is a schematic diagram of another embodiment of a boost regulator system 50. The boost regulator system 50 includes a boost regulator 51, flash LED circuitry 52, an output capacitor 53, and a feedback circuit 54.

As shown in FIG. 3B, the boost regulator system 50 receives a flash control signal FLASH, which is used to selectively activate the flash LED circuitry 52. The boost regulator system 50 receives an input voltage $V_{IN}$, which can be a battery voltage. The boost regulator system 50 further receives a current level control signal LED_CURRENT, which is used to control a current level of the flash LED circuitry 52. By including the current level control signal LED_CURRENT, an intensity or brightness of a flash can be controlled. The boost regulator system 50 further receives a mode signal MODE, which is used to control the boost regulator 51 to operate in one of multiple modes.

In one embodiment, the flash signal FLASH, the current level control signal LED_CURRENT, and the mode signal MODE are digital signals.

The flash LED circuitry 52 includes a current source 57 and a flash LED 58, which are electrically connected in series with one another. Although FIG. 3B illustrates the flash LED circuitry 52 as including one current source and one flash LED, the flash LED circuitry 52 can include additional current sources, flash LEDs, and/or other circuitry.

The current source 57 is powered using an output voltage $V_{OUT}$ generated by the boost regulator 51. When the input voltage $V_{IN}$ has a relatively small voltage level, the boost regulator 51 can regulate the output voltage $V_{OUT}$ to have a voltage level greater than that of the input voltage $V_{IN}$ to provide the current source 57 with sufficient voltage headroom to generate the current for the flash LED 58.

The flash LED circuitry 52 receives the flash control signal FLASH, which is used to selectively activate the flash LED 58. The light output of the flash LED 58 changes based on the current of the current source 57. By controlling the magnitude of the current generated by the current source 57 over time, the light emissions of the flash LED 58 can be controlled. In certain configurations, the flash control signal FLASH is used to control the current source 57 to generate a current pulse operable to generate a flash of light using the flash LED 58.

The flash LED circuitry 52 further receives the current level control signal LED_CURRENT, which is used to control the intensity of light emissions of the flash LED 58 when the flash LED 58 is activated. For example, the current level control signal LED_CURRENT can control the maximum current level in a current pulse used to illuminate the flash LED 58. In one embodiment, the current level control signal LED_CURRENT controls the current level of a current pulse, and the flash control signal FLASH controls timing of when the current pulse occurs.

The boost regulator 51 includes an inductor 61, a first switch 62a, a second switch 62b, a switch control circuit 63, a current source headroom detection circuit 64, a boost regulator control circuit 65, and a reference voltage generation circuit 66.

The inductor 61 and the second switch 62b are electrically connected in series with one another between the input voltage $V_{IN}$ and the output voltage $V_{OUT}$, with a first node $N_1$ between the inductor 61 and the second switch 62b. The first switch 62a is electrically connected between the first node $N_1$ and a first voltage $V_1$, which can be, for example, ground. As shown in FIG. 3B, the switch control circuit 63 receives a feedback signal FBK, a reference voltage VREF, and a mode signal MODE, and is used to control opening and closing of the first and second switches 62a, 62b.

The mode signal MODE is used to operate the boost regulator 51 in one of multiple modes, including a bypass mode and a boost mode. When the mode signal MODE indicates that the boost regulator 51 operates in the bypass mode, the switch control circuit 63 can turn off the first switch 62a and turn on the second switch 62b, thereby electrically connecting the input voltage $V_{IN}$ to the output voltage $V_{OUT}$ through the inductor 61 and the second switch 62b. When the mode signal MODE indicates that the boost regulator 51 operates in the boost mode, the switch control circuit 63 can generate the output voltage $V_{OUT}$ using boost regulation such that the output voltage $V_{OUT}$ has a voltage level that is greater than that of the input voltage $V_{IN}$.

As skilled artisans will appreciate, the first and second switches 62a, 62b can be selectively turned on and off to control the current flowing through the inductor 61 to regulate the output voltage $V_{OUT}$. The switch control circuit 63 can selectively open and close the first and second switches 62a, 62b based on the feedback signal FBK, which is generated using the feedback circuit 54. In the illustrated configuration, the feedback circuit 54 is electrically connected between the output voltage $V_{OUT}$ and the first voltage $V_1$. Although one example of regulator feedback is illustrated, a boost regulator can operate with other configurations of feedback.

The switch control circuit 63 also receives the reference voltage $V_{REF}$, which can be used to control the magnitude of the output voltage $V_{OUT}$ when the boost regulator 51 operates in the boost mode. In the illustrated configuration, the reference voltage $V_{REF}$ is generated using the reference voltage generation circuit 66, which receives a reference voltage control signal from the boost regulator control circuit 65. By controlling the magnitude of the reference voltage $V_{REF}$ generated by the reference voltage generation circuit 66, the boost regulator control circuit 65 can control the magnitude of the output voltage $V_{OUT}$.

As shown in FIG. 3B, the output capacitor 53 is electrically connected between the output voltage $V_{OUT}$ and the first voltage $V_1$. The output capacitor 53 can operate as a decoupling capacitor for the output voltage $V_{OUT}$.

The boost regulator 51 includes the current source headroom detection circuit 64, which detects a voltage headroom of the current source 57. The current source headroom detection circuit 64 generates a headroom signal indicative of the current source's voltage headroom, and provides the headroom signal to the boost regulator control circuit 65.

In the illustrated configuration, the boost regulator control circuit 65 receives the headroom signal and the current level control signal LED_CURRENT, and generates the reference voltage control signal for the reference voltage generator 66.

As shown in FIG. 3B, the boost regulator control circuit 65 includes a regulation band control circuit 69, which controls a regulation band of the boost regulator 51 based on the current level control signal LED_CURRENT.

A fixed regulation band size can provide a relatively large separation between the output voltage $V_{OUT}$ and the input voltage $V_{IN}$ upon transitioning a boost regulator from the bypass mode to the boost mode. By providing a relatively large separation between the output voltage $V_{OUT}$ and the input voltage $V_{IN}$, the boost regulator can operate with a relatively stable output voltage having a relatively small output ripple. However, such a boost regulator can operate with decreased efficiency when a flash LED is operated at low current levels.

The boost regulator 51 of FIG. 3B operates with a regulation band that changes based on the current level of the flash LED 58. In particular, the regulation band control circuit 69 receives the current level control signal LED_CURRENT, and controls the boost regulator's regulation band based on the current level control signal LED_CURRENT. By controlling the boost regulator 51 in this manner, the overall efficiency of the boost regulator system 50 can be enhanced over the current range of the flash LED 58. Thus, the boost regulator 51 operates with a regulation band size that dynamically changes based on load current.

Although one example of a boost regulator system is illustrated in FIG. 3B, the teachings herein are applicable to a wide variety of boost regulator systems. For example, the teachings herein are applicable to configurations using other implementations of light emitting elements and/or boost regulators.

Additional details of the boost regulator system 50 can be as described earlier.

Figure 4:
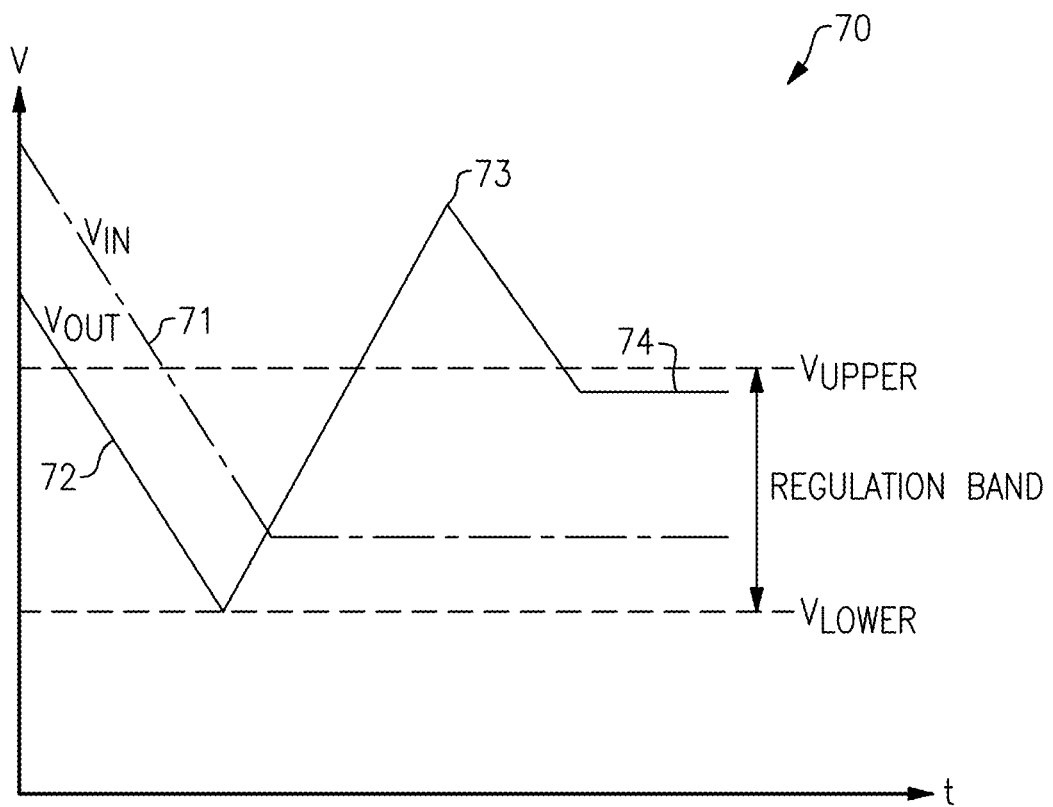
FIG. 4 is a graph of voltage versus time for one embodiment of a boost regulator.

FIG. 4 is a graph 70 of voltage versus time for one embodiment of a boost regulator. The graph 70 includes a first plot 71 of input voltage $V_{IN}$ versus time and a second plot 72 of output voltage $V_{OUT}$ versus time for a boost regulator that is transitioned from a bypass mode to a boost mode. The graph 70 can represent one example of voltage versus time waveforms for the boost regulator system 50 of FIG. 3B. However, the boost regulator system 50 can be operated in other ways.

The graph 70 has been annotated to include a regulation band that includes an upper band voltage $V_{UPPER}$ and a lower band voltage $V_{LOWER}$. When operated in the boost mode, the regulator can control regulation to maintain the output voltage $V_{OUT}$ in the regulation band. For example, for the boost regulator system 50 of FIG. 3B, the boost regulator control circuit 65 can control the magnitude of the reference voltage $V_{REF}$ generated by the reference voltage generator 66, thereby controlling the output voltage $V_{OUT}$ to the desired voltage level when operating in the boost mode.

A boost regulator can have an output voltage that includes ripple when the output voltage is close to the input voltage for a light-load condition. The ripple can be associated with insufficient current-sense information when the output voltage and the input voltage are relatively close to one another. For instance, when operating in this manner, duty-cycle limitations of the boost regulator can result in poor regulation performance and large output ripples.

To reduce or eliminate output ripple in such operating conditions, the boost regulator can operate with an output voltage that is controlled to be higher than normal at light-load conditions, such that the boost regulator operates with sufficient current-sense information. When transitioning the boost regulator from bypass mode to boost mode, the output voltage of the boost regulator can be controlled above the upper band voltage $V_{UPPER}$ of the boost regulator's regulation band. For instance, as shown by region 73 of the graph 70, the output voltage $V_{OUT}$ can be controlled to a voltage that is above the upper band voltage $V_{UPPER}$.

Configuring the boost regulator in this manner can increase a voltage difference between the output voltage and the input voltage when commencing boost mode. After the boost regulator is transitioned from the bypass mode to the boost mode, the boost regulator's regulation can result in the output voltage $V_{OUT}$ being controlled to an upper portion of the regulation band. For instance, as shown by region 74 of the graph 70, the output voltage $V_{OUT}$ can remain in the upper portion of the regulation band, and provide a relatively large separation between the output voltage $V_{OUT}$ and the input voltage $V_{IN}$ and robust current-sense information.

The boost regulators herein operate with a regulation band that changes based on the current level of the flash LED or other light emitting element. By controlling the boost regulator in this manner, the overall efficiency of the system can be enhanced over the current range of the flash LED. Thus, the boost regulators operate with a regulation band size that dynamically changes based on the load current of the boost regulator.

In one embodiment, the upper band voltage $V_{UPPER}$ is controlled based on the current level of the flash LED or other light emitting element.

Figure 5:
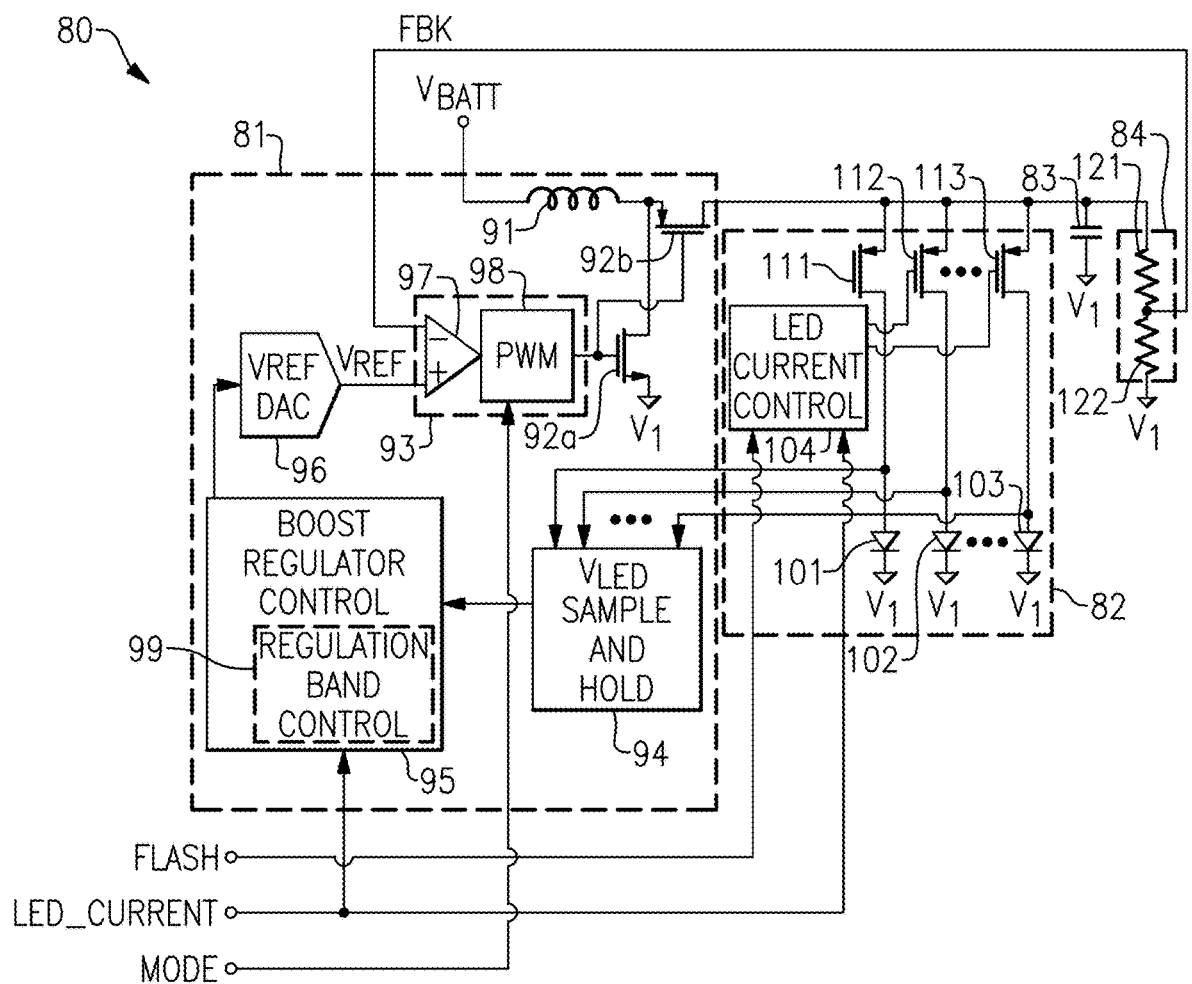
FIG. 5 is a schematic diagram of another embodiment of a boost regulator system.

FIG. 5 is a schematic diagram of another embodiment of a boost regulator system 80. The boost regulator system 80 includes a boost regulator 81, flash LED circuitry 82, an output capacitor 83, and a feedback circuit 84.

The flash LED circuitry 82 includes a first flash LED 101, a second flash LED 102, a third flash LED 103, a LED current control circuit 104, a first field effect transistor (FET) current source 111, a second FET current source 112, and a third FET current source 113. Although FIG. 5 illustrates a configuration of flash LED circuitry with three flash LEDs, the teachings herein are applicable to configurations using more or fewer flash LEDs. Furthermore, although FIG. 5 illustrates a configuration of flash LED circuitry with three current sources, the teachings herein are applicable to configurations using more or fewer current sources. Moreover, although FIG. 5 illustrates a configuration using p-type FET current sources, other implementations of current sources can be used.

The LED current control circuit 104 receives a flash control signal FLASH, which can be used to selectively activate the first flash LED 101, the second flash LED 102, and/or the third flash LED 103. The LED current control circuit 104 further receives a current level control signal LED_CURRENT, which can be used to control the current levels of the flash LEDs 101-103, thereby controlling an intensity of light emissions during flash events. In certain configurations, the current levels of the flash LEDs 101-103 are separately controllable such that the flash LEDs can have different current levels from one another. As shown in FIG. 5, the LED current control circuit 104 controls the gate voltages of the FET current sources 111-113. The gate voltages of the FET current sources 111-113 can be controlled over time to control the currents flowing through the flash LEDs 101-103, respectively.

The boost regulator 81 receives a battery voltage $V_{BATT}$ and generates an output voltage $V_{OUT}$.

The boost regulator 81 includes an inductor 91, a first FET switch 92a, a second FET switch 92b, a switch control circuit 93, a LED voltage sample and hold circuit 94, a boost regulator control circuit 95, and a reference voltage digital-to-analog converter (DAC) 96. In the illustrated configuration, the first FET switch 92a is an n-type FET and the second FET switch 92b is a p-type FET. However, other configurations are possible.

The illustrated switch control circuit 93 includes a comparator 97 and a pulse width modulator (PWM) 98. The comparator 97 compares a feedback signal FBK generated by the feedback circuit 84 to a reference voltage $V_{REF}$ generated by the reference voltage DAC 96. The PWM 98 controls the first and second FET switches 92a, 92b. The PWM 98 receives a mode signal MODE, which is used to operate the boost regulator 81 is a selected mode. When the boost regulator 81 is operating in a bypass mode, the PWM 98 turns off the first FET switch 92a and turns on the second FET switch 92b. When the boost regulator 81 is operating in a boost mode, the PWM 98 controls the first and second FET switches 92a, 92b based on the output of the comparator 97. In the boost mode, the switch control circuit 93 operates to control the output voltage $V_{OUT}$ above the battery voltage $V_{BATT}$ by an amount of voltage that is based on the reference voltage $V_{REF}$.

In the illustrated configuration, the feedback circuit 84 includes a first feedback resistor 121 and a second feedback resistor 122, which are electrically connected as a voltage divider between the output voltage $V_{OUT}$ and the first voltage $V_1$. As shown in FIG. 5, the output capacitor 83 is electrically connected between the output voltage $V_{OUT}$ and the first voltage $V_1$. However, other configurations are possible.

The LED voltage sample and hold circuit 94 is used to generate a current source headroom signal based on sampling and holding the voltages across the flash LEDs 101-103. The sampled LED voltages are indicative of the voltage headroom of the FET current sources 111-113. The boost regulator control circuit 95 receives the headroom signal, and controls a reference voltage control signal that serves as an input to the reference voltage DAC 96.

As shown in FIG. 5, the boost regulator control circuit 95 includes a regulation band control circuit 99, which controls a regulation band of the boost regulator 81 based on the current level control signal LED_CURRENT. Thus, the boost regulator 81 of FIG. 5 operates with a regulation band that changes based on the current level of the flash LEDs 101-103. In particular, the regulation band control circuit 99 receives the current level control signal LED_CURRENT, and controls the boost regulator's regulation band based on the current level control signal LED_CURRENT. By controlling the boost regulator 81 in this manner, the overall efficiency of the boost regulator system 80 can be enhanced over the current range of the flash LEDs 101-103. Thus, the boost regulator 81 operates with a regulation band size that is dynamically adjusted by the regulation band control circuit 99.

Additional details of the boost regulator system 80 can be as described earlier.

Figure 6:
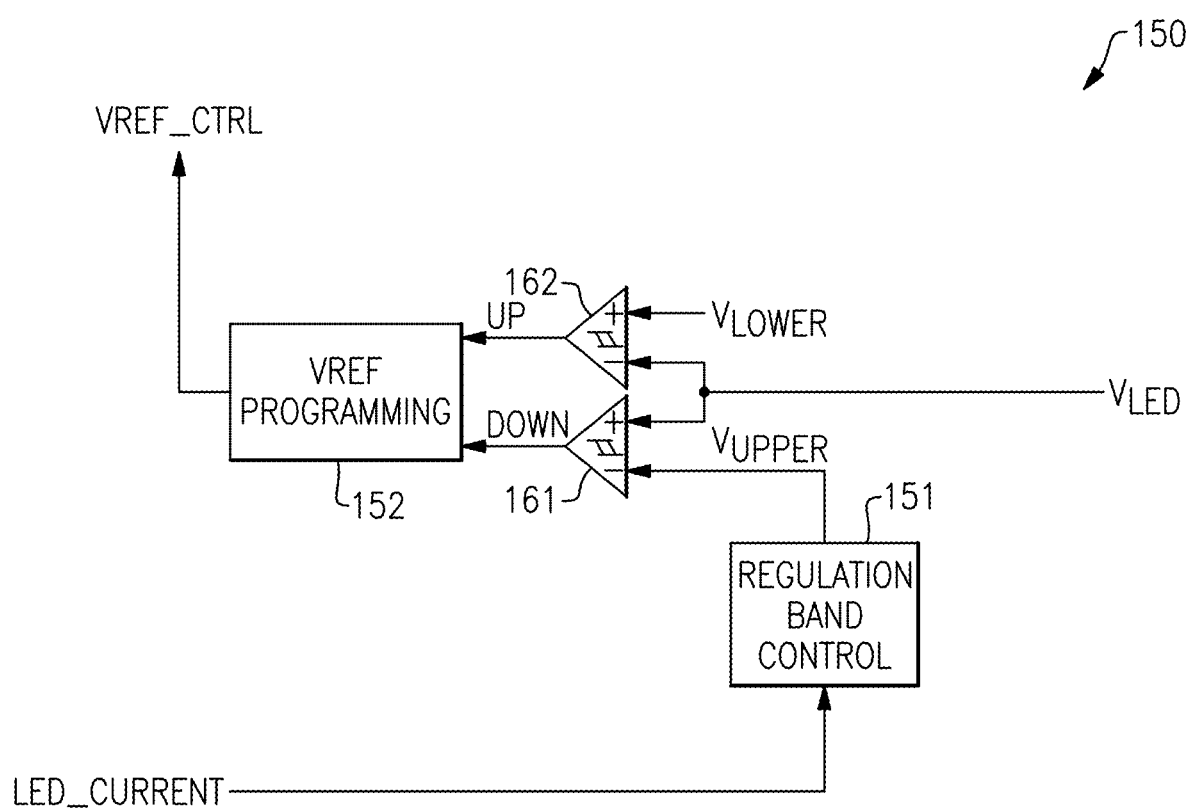
FIG. 6 is a schematic diagram of a boost regulator control circuit according to one embodiment.

FIG. 6 is a schematic diagram of a boost regulator control circuit 150 according to one embodiment. The boost regulator control circuit 150 includes a regulation band control circuit 151, a reference voltage programming circuit 152, a first hysteretic comparator 161, and a second hysteretic comparator 162. The boost regulator control circuit 150 illustrates one example of a boost regulator control circuit that can be used in the boost regulator systems described herein. However, boost regulator control circuits can be implemented in a wide variety of ways.

The boost regulator control circuit 150 receives a current source headroom signal $V_{LED}$, which indicates an amount of headroom of a current source used to provide current to a flash LED or other light emitting element. As shown in FIG. 6, the current source headroom signal $V_{LED}$ is compared to an upper band voltage $V_{UPPER}$ using the first hysteric comparator 161, and to a low band voltage $V_{LOWER}$ using the second hysteric comparator 162. The outputs of the first and second hysteric comparators 161, 162 are provided to the reference voltage programming circuit 152, which processes the comparison information to control a boost regulator's reference voltage up or down in voltage. As shown in FIG. 6, the reference voltage programming circuit 152 generates the reference voltage control signal VREF_CTRL, which is provided to a boost regulator's reference voltage generation circuit.

The boost regulator control circuit 150 can be used to control a boost regulator's reference voltage over time to maintain the boost regulator's output voltage in a regulation band corresponding to a voltage range between the upper band voltage $V_{UPPER}$ and the lower band voltage $V_{LOWER}$.

The illustrated boost regulator control circuit 150 uses the regulation band control circuit 151 to control the voltage level of the upper band voltage $V_{UPPER}$ based on a current level control signal LED_CURRENT, which is used to control the current level of a flash LED or other light emitting element.

Accordingly, the boost regulator control circuit 150 provides a boost regulator with a regulation band that changes based on the current level of the flash LED or other light emitting element. By controlling the boost regulator in this manner, the overall efficiency of the system can be enhanced over the current range of the flash LED. Thus, the boost regulator operates a regulation band size that dynamically changes based on the load current of the boost regulator.

In one embodiment, the regulation band control circuit 151 includes a look-up table (LUT) and a DAC. The LUT maps the current level control signal LED_CURRENT to a desired value of a digital upper band signal, and the DAC generates the upper band voltage $V_{UPPER}$ based on digital-to-analog conversion of the digital upper band signal. However, other configurations of the regulation band control circuit 151 are possible.

Additional details of the boost regulator control circuit 150 can be as described earlier.

Figure 7:
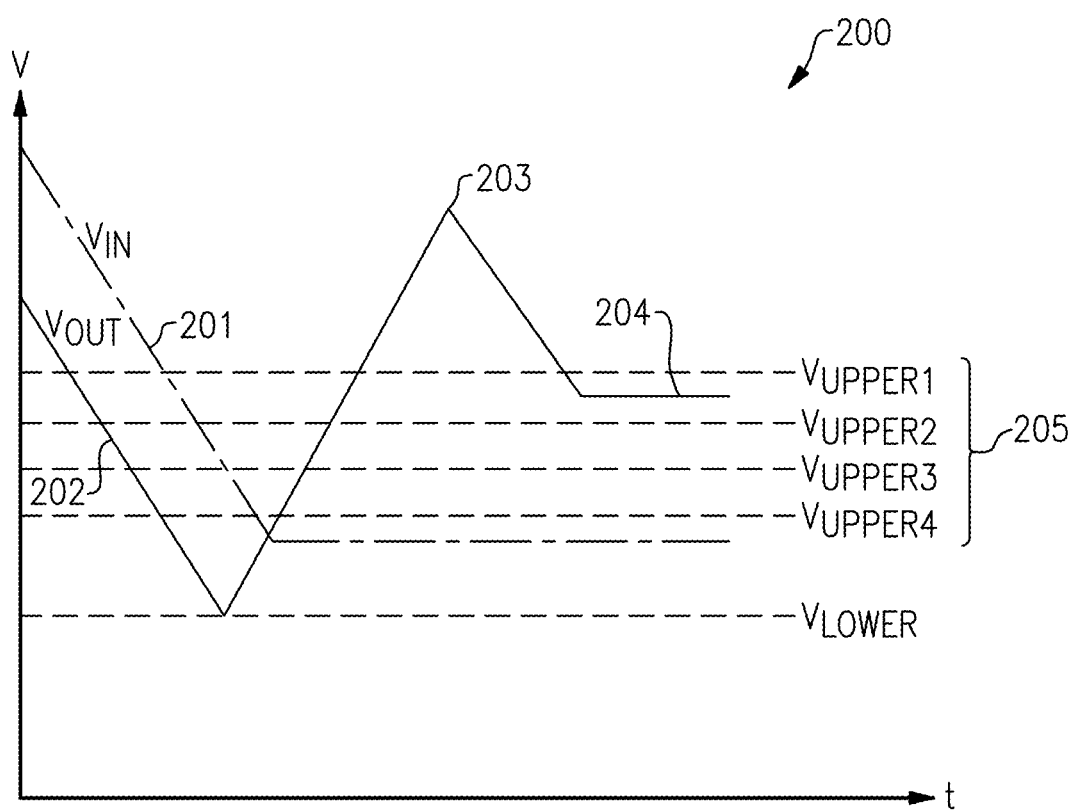
FIG. 7 is a graph of voltage versus time for another embodiment of a boost regulator.

FIG. 7 is a graph 200 of voltage versus time for one embodiment of a boost regulator. The graph 200 includes a first plot 201 of input voltage $V_{IN}$ versus time and a second plot 202 of output voltage $V_{OUT}$ versus time for a boost regulator that is transitioned from a bypass mode to a boost mode. The graph 200 can represent one example of voltage versus time waveforms for the boost regulator system 80 of FIG. 5. However, the boost regulator system 80 can be operated in other ways.

The graph 200 has been annotated to include a regulation band that includes an upper band voltage 205 and a lower band voltage $V_{LOWER}$. When operated in the boost mode, the regulator provides regulation to maintain the output voltage $V_{OUT}$ in the regulation band. For example, for the boost regulator system 80 of FIG. 5, the boost regulator control circuit 95 can control the magnitude of the reference voltage $V_{REF}$ generated by the reference voltage DAC 96, thereby controlling the output voltage $V_{OUT}$ to the desired voltage level when operating in the boost mode.

In the illustrated an example, the boost regulator operates with an output voltage that is controlled to be higher than normal at light-load conditions, such that the boost regulator operates with sufficient current-sense information. When transitioning the boost regulator from bypass mode to boost mode, the output voltage of the boost regulator can be controlled above the upper band voltage 205 of the boost regulator's regulation band. For instance, as shown by region 203 of the graph 200, the output voltage $V_{OUT}$ can be controlled to a voltage that is above the upper band voltage 205.

Configuring the boost regulator in this manner can increase a voltage difference between the output voltage and the input voltage when commencing boost mode. After the boost regulator is transitioned from the bypass mode to the boost mode, the boost regulator's regulation can result in the output voltage $V_{OUT}$ being controlled to an upper portion of the regulation band. For instance, as shown by region 204 of the graph 200, the output voltage $V_{OUT}$ can remain in the upper portion of the regulation band, and provide a relatively large separation between the output voltage $V_{OUT}$ and the input voltage $V_{IN}$ and robust current-sense information.

In the illustrated embodiment, the width of the boost converter's regulation band changes based on the current level of the flash LED or other light emitting element. In particular, the upper band voltage 205 is controlled to one of a plurality of different voltage levels based on the current level of the flash LED or other light emitting element. For example, the upper band voltage 205 can be controlled to a first upper band voltage $V_{UPPER1}$, a second upper band voltage $V_{UPPER2}$, a third upper band voltage $V_{UPPER3}$, or a fourth upper band voltage $V_{UPPER4}$, in this example. Thus, the boost regulator has an upper band voltage that dynamically changes based on the current level of the flash LED or other light emitting element. Although the illustrated example controls the upper band voltage to one of four levels, an upper band voltage can be controlled to more or fewer levels.

Applications

Some of the embodiments described above have provided examples in connection with wireless devices or mobile phones. However, the principles and advantages of the embodiments can be used for any other systems or apparatus that have needs for boost regulators with dynamic regulation band.

Such boost regulators can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A boost regulator system comprising:
a field effect transistor current source having a gate controlled by a current level control signal, a source that receives a regulator output voltage, and a drain that outputs a current; and
a boost regulator configured to generate the regulator output voltage based on a reference voltage, the boost regulator including a voltage sample and hold circuit electrically coupled to the drain of the field effect transistor current source and operable to generate a headroom signal indicating a detected voltage headroom of the field effect transistor current source, the boost regulator further including a regulator control circuit configured to control a voltage level of the reference voltage based on the headroom signal, and to control a size of a regulation band of the boost regulator based on the current level control signal.

2. The boost regulator system of claim 1 wherein the regulator control circuit is further configured to control a voltage level of an upper band voltage of the regulation band based on the current level control signal, and to control the voltage level of the reference voltage based on comparing the headroom signal to the upper band voltage.

3. The boost regulator system of claim 2 wherein the regulator control circuit is further configured to control the voltage level of the reference voltage based on comparing the headroom signal to a lower band voltage of the regulation band.

4. The boost regulator system of claim 3 wherein the boost regulator further includes a first hysteretic comparator configured to compare the headroom signal to the upper band voltage, and a second hysteretic comparator configured to compare the headroom signal to the lower band voltage.

5. The boost regulator system of claim 1 wherein the boost regulator further includes a plurality of switches and a switch controller operable to selectively open and close the plurality of switches based on comparing the reference voltage to a feedback voltage.

6. The boost regulator system of claim 5 further comprising a feedback circuit electrically coupled to the source of the field effect transistor current source and operable to generate the feedback voltage.

7. The boost regulator system of claim 1 further comprising a battery that powers the boost regulator with a battery voltage.

8. The boost regulator system of claim 7 wherein the boost regulator is operable in a selected mode chosen from a plurality of modes including a bypass mode and a boost mode, the boost regulator configured to control the regulator output voltage above the battery voltage in the boost mode.

9. A mobile device comprising:
a battery that outputs a battery voltage; and
a boost regulator system including a boost regulator configured to generate a regulator output voltage based on the battery voltage and a reference voltage, the boost regulator system further including a field effect transistor current source powered by the regulator output voltage and providing a current that is controlled by a current level control signal, the boost regulator including a voltage sample and hold circuit operable to generate a headroom signal indicating a detected voltage headroom of the field effect transistor current source, and a regulator control circuit configured to control a voltage level of the reference voltage based on the headroom signal, and to control a size of a regulation band of the boost regulator based on the current level control signal.

10. The mobile device of claim 9 wherein the regulator control circuit is further configured to control a voltage level of an upper band voltage of the regulation band based on the current level control signal, and to control the voltage level of the reference voltage based on comparing the headroom signal to the upper band voltage.

11. The mobile device of claim 10 wherein the regulator control circuit is further configured to control the voltage level of the reference voltage based on comparing the headroom signal to a lower band voltage of the regulation band.

12. The mobile device of claim 11 wherein the boost regulator further includes a first hysteretic comparator configured to compare the headroom signal to the upper band voltage, and a second hysteretic comparator configured to compare the headroom signal to the lower band voltage.

13. The mobile device of claim 9 wherein the boost regulator further includes a plurality of switches and a switch controller operable to selectively open and close the plurality of switches based on comparing the reference voltage to a feedback voltage.

14. The mobile device of claim 13 wherein the boost regulator system further includes a feedback circuit electrically coupled to a source of the field effect transistor current source and operable to generate the feedback voltage.

15. The mobile device of claim 9 wherein the reference voltage controls an amount of voltage that the regulator output voltage is above the battery voltage.

16. A method of voltage regulation, the method comprising:
powering a field effect transistor current source using a regulator output voltage of a boost regulator;
controlling a current provided by the field effect transistor current source using a current level control signal;
detecting a voltage headroom of the field effect transistor current source;
controlling a voltage level of a reference voltage to the boost regulator based on the detected voltage headroom; and
controlling a size of a regulation band of the boost regulator based on the current level control signal.

17. The method of claim 16 further comprising controlling a voltage level of an upper band voltage of the regulation band based on the current level control signal, and controlling the voltage level of the reference voltage based on comparing the headroom signal to the upper band voltage.

18. The method of claim 17 further comprising controlling the voltage level of the reference voltage based on comparing the headroom signal to a lower band voltage of the regulation band.

19. The method of claim 16 further comprising selectively opening and closing a plurality of switches of the boost regulator based on comparing the reference voltage to a feedback voltage.

20. The method of claim 19 further comprising generating the feedback voltage using a feedback circuit electrically coupled to a source of the field effect transistor current source.

* * * * *